No. 772,976. Patented October 25, 1904.

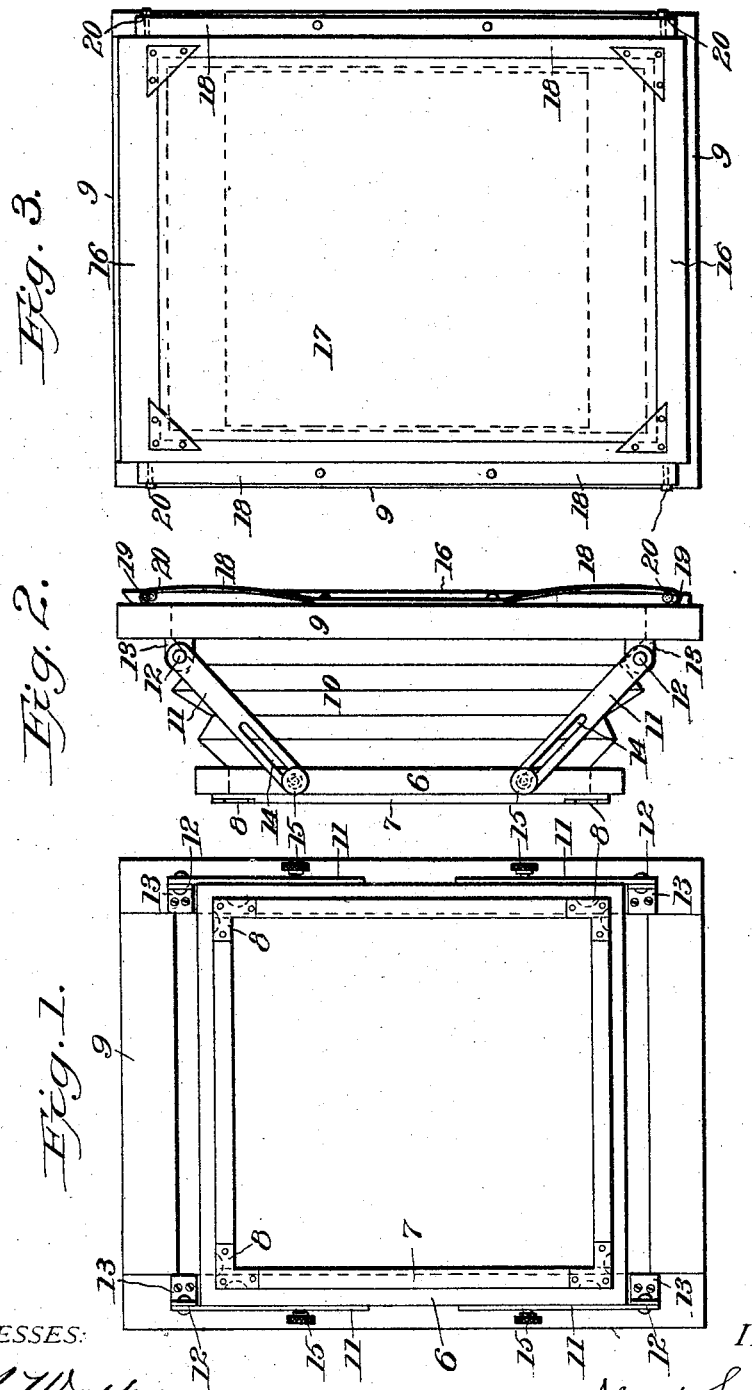

UNITED STATES PATENT OFFICE.

ALBERT L. SWARTZ, OF JUNCTION CITY, OREGON, ASSIGNOR OF ONE-HALF TO ALBERT R. MARTIN, OF JUNCTION CITY, OREGON.

ENLARGING ATTACHMENT FOR CAMERAS.

SPECIFICATION forming part of Letters Patent No. 772,976, dated October 25, 1904.

Application filed February 13, 1904. Serial No. 193,390. (No model.)

*To all whom it may concern:*

Be it known that I, ALBERT L. SWARTZ, a citizen of the United States, residing at Junction City, in the county of Lane and State of Oregon, have invented new and useful Improvements in Enlarging Attachments for Cameras, of which the following is a specification.

This invention relates particularly to an attachment intended to be placed upon a camera to enable larger pictures to be taken than those for which the camera was designed, commonly known as an "enlarging" attachment.

Its object is to produce an improved device with which such result may be effected.

A further object is to produce improved means for supporting the enlarging attachment in position on the back of the camera.

A further object is to provide improved means for holding the enlarging attachment in focus.

These and other objects are to be effected by the means hereinafter described, and illustrated in the accompanying drawings, in which—

Figure 1 is a front view of the attachment. Fig. 2 is a side elevation. Fig. 3 is a back view.

The attachment comprises a bellows having at the front end a frame with means for attachment to the back frame of the camera and having at the rear end a frame to hold the ground glass and to receive the plate-holder, and also having connections between said frames whereby when the front frame is attached to the back of the camera the rear frame will be supported in proper position and focus.

Referring particularly to the drawings, 6 indicates the front frame. This has on the face thereof a strip 7, which fits within the back frame of an ordinary bellows-camera upon removal of the ordinary plate-holder and ground glass therefrom. To fasten the frame 6 to the back of the camera, metal clips 8 are used. These are located at the corners of the frame upon the strips 7, and when placed in position engage the back frame of the camera and hold the parts together.

The back frame of the attachment is indicated at 9, and the bellows connecting the two frames is shown at 10. To connect and support the back frame upon the front frame, swinging arms 11 are used. There are four of these arms, two on a side. Each arm is pivoted at 12 to a bracket 13, secured to the back frame at the corners thereof, and at the inner ends the arms are slotted, as at 14, to receive a thumb-screw 15, the point of which extends into the frame 6. When the thumb-screws are loosened, the back frame may be moved in or out to get the focus, and then the parts are fastened as set by the thumb-screws 15. The slots in the arms permit the focusing movement indicated and also permit the back to be tilted if and when desired, the advantages of a tilting back being well known and understood.

The back frame 9 on its rear side is recessed to receive the ground-glass frame 16, the ground glass being indicated at 17, and this frame may be pulled out or back to the extent permitted by the springs 18, so that the plate-holder may be inserted between the ground-glass frame 16 and the back frame 9 in a manner common to such devices. The springs 18 extend lengthwise along two sides of the back frame and are fastened thereto in the middle, leaving free ends which are recurved at the extremities to form hooks, as at 19. Pins 20 project laterally from the ground-glass frame 16 under the free ends of the springs, which by their pressure on the pins normally hold the back frame and ground-glass frame together, and the springs yield to allow the ground-glass frame to be opened to let in a plate-holder between. The extent of this yielding movement is limited by the hooks 19, as at the limit of the movement the pins 20 enter the hooks and further movement is prevented. The hooks also prevent the ground-glass frame from accidentally falling off or becoming disarranged.

In use the front frame 6 is fastened to the back of the camera by means heretofore indicated, and the back frame 9, which carries a larger plate-holder than the existing camera, is moved to proper focus and then fixed by the set-screws, and the arms 11 being rigid hold the back frame in place, so that no bottom board is necessary. The plate-holder is then inserted in the back frame and the plate exposed in the ordinary manner.

The device will be found very useful to owners of small cameras who may desire to take a larger picture than such cameras ordinarily permit.

What I claim as new, and desire to secure by Letters Patent, is—

1. An enlarging attachment for cameras comprising a front frame having means to attach it to a camera, a back frame having means to hold a plate-holder, a bellows between the frames, and a pair of arms on each side pivoted at one end to one of the frames and having means at the other end to adjustably engage and support the other frame at various angles.

2. The combination with a camera, of an enlarging attachment comprising a front and a back frame, means to attach the same to the camera, a bellows between the frames, and adjustable arms extending between the frames, supporting, and permitting tilt of, the back frame, with respect to the focal line of the camera.

In testimony whereof I have signed my name to this specification in the presence of two subscribing witnesses.

ALBERT L. SWARTZ.

Witnesses:
A. R. MARTIN,
A. E. TOWER.